Figure 1:
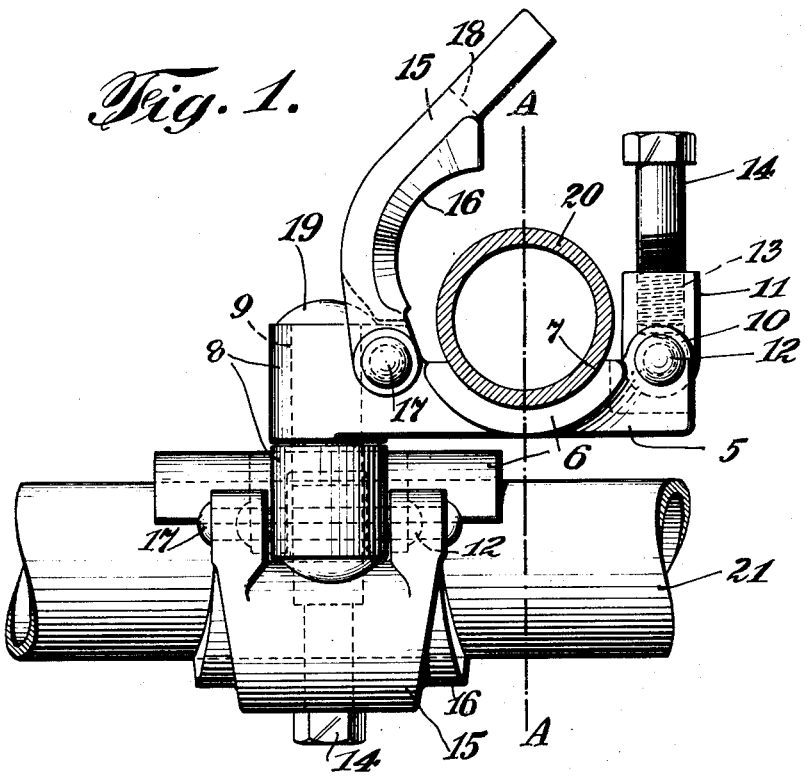

Jan. 31, 1933.  S. E. BATES  1,895,746
COUPLING DEVICE
Filed Dec. 31, 1929

INVENTOR
S. E. Bates
BY C. P. Goepel
his ATTORNEY

Patented Jan. 31, 1933

1,895,746

UNITED STATES PATENT OFFICE

SIDNEY E. BATES, OF CHICAGO, ILLINOIS, ASSIGNOR TO AMERICAN SAFETY DEVICE COMPANY, OF NEW YORK, N. Y., A CORPORATION OF NEW YORK

COUPLING DEVICE

Application filed December 31, 1929. Serial No. 417,809.

This invention relates to coupling devices, and has for its primary object and purpose to provide simply constructed adjustable coupling means which may be applied with ease and facility to adjacent supporting elements of a scaffold or other structure disposed in angularly intersecting relation to each other.

It is a more particular object of the invention in one practical embodiment thereof to provide such a coupling means or device embodying two clamping units detachably engageable with the respective tubes, beams or other supporting elements together with a swiveled connection between said clamping units having its axis laterally offset from the clamping parts of such units which are engaged with the supporting elements and permitting of the relative bodily adjustment of the clamping units as may be required for their proper application to the crossed or intersecting supporting elements.

It is also another object of the invention to provide a clamping unit in couplings of this character having hingedly connected clamping parts for engagement upon opposite sides of the tube or other supporting element together with an internally threaded socket member swiveled upon the end of one of said parts and a clamping screw or bolt adapted for engagement in the slotted free end of the other clamping part and adjustable in said socket member.

It is also a further general object of the invention to provide an adjustable coupling device as above characterized, the several parts of which are of very rugged substantial form so that they will withstand severe or abusive handling to which such devices are often subjected, without liability of breakage of such parts.

With the above and other objects in view, the invention consists in the improved adjustable coupling devices, and in the form, construction and relative arrangement of its several elements as will be hereinafter more fully described, illustrated in the accompanying drawing, and subsequently incorporated in the subjoined claims.

In the drawing, wherein I have disclosed one simple and practical embodiment of the invention, and in which similar reference characters designate corresponding parts throughout the several views,—

Figure 2:
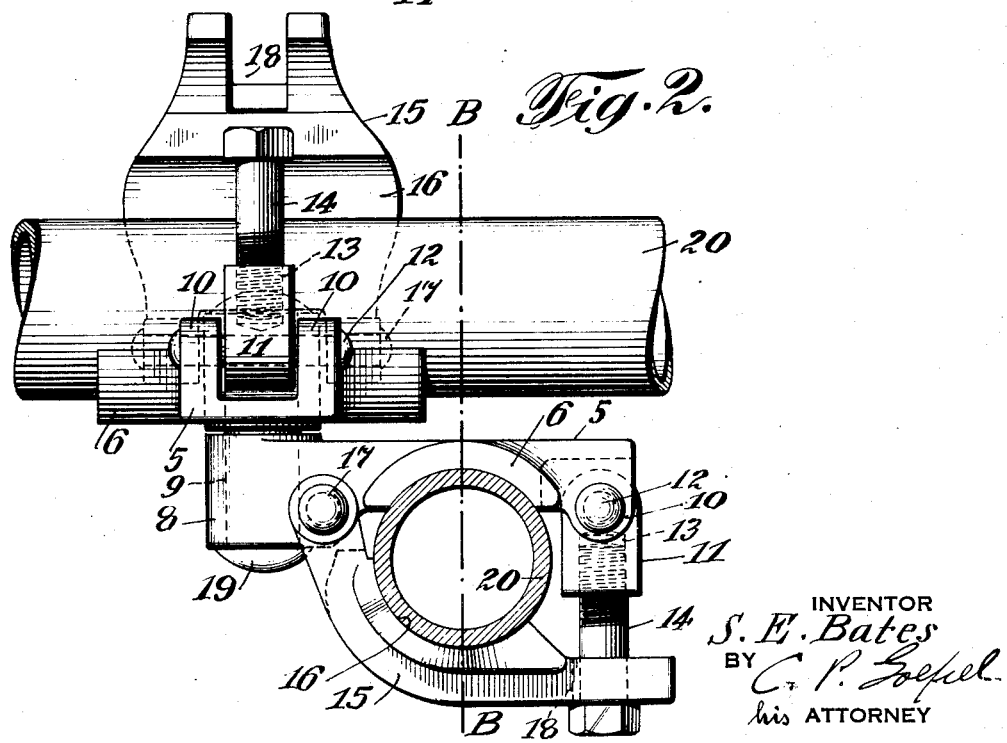

Figure 1 is an elevation illustrating one practical embodiment of my present invention and showing the manner of application of the device to the elements to be coupled together, and Fig. 2 is an elevation looking at right angles to the direction of Fig. 1.

Coupling devices of the type with which the subject matter of this application is concerned are of more or less recent development necessitated by the use of scaffold structures in the erection, remodeling, repair or decoration of building structures in which lengths of metal tubing are employed for the purpose of supporting and bracing the horizontal platforms of the scaffold structure. Several kinds of such coupling devices are now in extensive use, and are characterized primarily by the fact that they each embody two clamps for detachable engagement upon the adjacent crossed tubular supporting elements. These clamps are either rigidly connected with each other for application to supporting elements which extend in one definite angular relation to each other, or they are connected by means which permits of a relative bodily rotative adjustment of the two clamps about an axis intersecting the centers of the clamps so that they may be applied to the adjacent supporting elements regardless of the particular angular relation in which said elements may be disposed. It is more particularly to this latter type of coupling device that my present invention relates, and my improvement consists essentially in the location of the axis of the swiveled connection between the two clamps in laterally offset relation from the clamp centers so that the application of the coupling device to the supporting elements with greater ease and facility is possible, as well as maximum security in the coupling connection with a better distribution of the strains and stresses whereby the serviceability of such couplings will be materially increased.

To the above end, in the practical embodiment of my invention as shown in the drawing, each of the clamps includes a body member 5 which is in the form of an elongated plate or casting having an intermediate relatively wide concavo-convex section 6 providing the concave seat indicated at 7. One end of this body member terminates in a bearing part 8 of increased thickness having an opening 9 therethrough, the axis of which is laterally spaced from the concavo-convex section 6 and extends at right angles to the seat 7. The body member 5 at its opposite end, and closely adjacent to the section 6 terminates in the spaced ears 10 between which a socket member 11 is swiveled at one of its ends on the pin 12. The internally threaded bore 13 of this socket member adjustably receives the threaded shank of the clamping bolt 14.

The other complementary part of each clamp consists of a plate or casting 15 having a relatively wide intermediate portion longitudinally curved and provided with the concave seat 16 opposed to the seat 7 of the body member 5. One end of the part 15 is hingedly connected to the body member 5 between the section 6 thereof and the opening 9 by means of the transverse pin 17. The other or free end of the part 15 beyond the seat 16 thereof is provided with a central longitudinally extending slot 18 opening upon the end of said part and which is adapted to receive the shank of the clamping bolt 14 in the application of the device.

The two clamps above described, each constituting a separate and distinct clamping unit, are permanently connected together for relative bodily adjustment by means of the swivel bolt or pin 19 loosely disposed through the aligned openings 9 in the ends of the body parts 5 of the respective clamps. Each end of the pin 19 is provided with a substantial rivet head effective to resist all ordinary strains or pressures which may be applied thereto in the use of the device and preclude every possibility of the separation of the two clamps.

In the use of my improved coupling device as above described, the respective clamps are applied to two adjacent tubular elements shown at 20 and 21 respectively, which may be suitably secured to a scaffold platform to support the same, or coupled to other similar platform supporting elements. In the drawing, I have shown the tubular supporting elements as disposed at right angles to each other, but it is apparent that by reason of the swiveled connection between the two clamping units, the device may as well be applied and used for the purpose of coupling such elements when they are disposed in various other angular relations. In applying the device, after properly adjusting and positioning the two clamps, the body members 5 thereof are engaged with the opposed sides of the tubular elements 20 and 21, the seats 7 of said body members being formed to snugly fit against the surfaces of said tubular elements. During this application of the body members 5, the swiveled socket members 11 are swung outwardly to a longitudinally extending position. The clamping part 15 is then swung inwardly upon the hinge pin 17 to engage its seat 16 against the opposite side of the tubular supporting element. After each clamp has thus been closed, the socket members 11 and bolts 14 are swung inwardly, the shanks of the bolts entering the slots 18 of the clamping parts 15. These bolts are then adjusted so that the bolt heads are caused to exert an inward bearing pressure against the ends of the clamping parts 15. Thus the respective supporting elements 20 and 21 are tightly clamped and held between the seats 7 and 16 of the respective clamping units, and said units being connected by the heavy swivel pin 19, the supporting elements are thus securely coupled together against relative displacement. It will be seen that by reason of the fact that the connecting swivel pin 19 is laterally offset from the parts of the respective clamps which engage the tubular elements, the clamps may be very easily and quickly applied to said tubular elements. In other words, when the coupling units are secured in their applied positions upon the respective tubular elements, each of said units is disposed in laterally offset relation to a plane (A—A in Fig. 1, B—B in Fig. 2) which centrally bisects the tubular element engaged by the other of said units. Also, this arrangement serves to relieve the clamping bolts 14 of much of the strain which would be incident to the application of a heavy weight or pressure against tubular supporting elements, such strains being largely borne by the substantial swivel pin 19. Thus liability of stripping the bolt threads, resulting in the release of the clamp, is reduced to a minimum.

From the foregoing description, considered in connection with the accompanying drawing, it will be seen that I have provided a very simple and serviceable type of adjustable coupling device for the tubular supporting elements of scaffolds and other structures. Since the several parts may be readily produced in the form of simple castings, it will also be apparent that the production cost of such a coupling will be comparatively low. Further, in view of the rugged and substantial form of these parts, the device is capable of successfully resisting very severe strains and is not liable to easy breakage, due to rough or abusive handling of the device. I have herein shown a practical construction of my present improvements, though it will be manifest that as to the several essential features thereof above described, the same may also be incorporated in various other alternative structural forms, and I therefore, reserve the privilege of resorting to all such legitimate changes therein as may be fairly embodied within the spirit and scope of the invention as claimed.

I claim:

1. Coupling means comprising two coupling devices each adapted to be secured to one of two elements to be coupled together, each of said devices including a body member having an elongated seat for the element and provided intermediate of its ends with transversely projecting lugs extending from opposite sides thereof, a clamping member hinged at one of its ends to one of said lugs, means pivotally connected to the other lug adapted to cooperate with said clamping member to clamp said member against the opposite side of the element, and means directly connecting said first named lugs on the body members of the two coupling units with each other for relative pivotal movement of the coupling units in parallel planes for application to the elements to be coupled in various intersecting angular positions of the latter.

2. Coupling means comprising two coupling devices each adapted to be secured to one of two elements to be coupled together, each of said devices including a body member having an elongated seat for the element and provided intermediate of its ends with transversely projecting lugs extending from opposite sides thereof, a clamping member hinged at one of its ends to one of said lugs, means pivotally connected to the other lug adapted to cooperate with said clamping member to clamp said member against the opposite side of the element, said first named lug having an opening therethrough extending at right angles to the hinge axis of the clamping member, and a pin extending through said openings and permanently connecting the lugs of the body members of said coupling units in superimposed relation and in permanent axial alignment, whereby said units are pivotally adjustable in parallel planes to various angular positions for application to the elements to be coupled.

In testimony that I claim the foregoing as my invention, I have signed my name hereto.

SIDNEY E. BATES.